(12) United States Patent
Pegoraro et al.

(10) Patent No.: US 11,292,631 B2
(45) Date of Patent: Apr. 5, 2022

(54) APPARATUS FOR UNLOADING MATERIAL AND BAG-EMPTYING MACHINE COMPRISING SAID APPARATUS

(71) Applicant: Main Tech S.r.l., Pianiga (IT)

(72) Inventors: Renato Pegoraro, Cadoneghe (IT); Stefano Rostin, San Giorgio delle Pertiche (IT)

(73) Assignee: MAIN TECH S.R.L., Pianiga (IT)

( * ) Notice: Subject to any disclaimer, the term of this patent is extended or adjusted under 35 U.S.C. 154(b) by 0 days.

(21) Appl. No.: 16/760,913

(22) PCT Filed: Oct. 30, 2018

(86) PCT No.: PCT/IB2018/058495
§ 371 (c)(1),
(2) Date: May 1, 2020

(87) PCT Pub. No.: WO2019/087067
PCT Pub. Date: May 9, 2019

(65) Prior Publication Data
US 2021/0179309 A1     Jun. 17, 2021

(30) Foreign Application Priority Data
Nov. 3, 2017    (IT) .................. 102017000125511

(51) Int. Cl.
*B65B 69/00*     (2006.01)
*B65G 47/90*     (2006.01)
*B65G 59/02*     (2006.01)

(52) U.S. Cl.
CPC .......... *B65B 69/0008* (2013.01); *B65G 47/90* (2013.01); *B65G 59/02* (2013.01)

(58) Field of Classification Search
CPC ...... B65B 69/0008; B65G 47/90; B65G 59/02
(Continued)

(56) References Cited

U.S. PATENT DOCUMENTS

| | | | |
|---|---|---|---|
| 4,207,021 A | 6/1980 | Burdett, Jr. | |
| 5,567,106 A * | 10/1996 | Gassner | B02C 18/0076 414/412 |
| 8,197,174 B1 | 6/2012 | Caron et al. | |

FOREIGN PATENT DOCUMENTS

| | | |
|---|---|---|
| DE | 3643076 | 7/1988 |
| EP | 1838582 | 1/2015 |

(Continued)

OTHER PUBLICATIONS

International Search Report and Written Opinion dated Jan. 10, 2019 for PCT Application PCT/IB2018/058495.

*Primary Examiner* — Lynn E Schwenning
(74) *Attorney, Agent, or Firm* — Stradley Ronon Stevens & Young, LLP

(57) ABSTRACT

An apparatus for unloading material. The apparatus comprises a hooking device mounted on a frame for hooking the material. The hooking device comprises a plurality of rows of curved hooks, each row of hooks being pivotable about a respective axis of rotation between a non-operating position, in which the hooks are retracted, and an operating position, in which the hooks are extended so as to hook the material. All the rows of hooks are pivotable from the non-operating position into the operating position along a hooking path, rotating in the same direction of rotation about the respective axes of rotation. The hooking device further comprises an abutment element that is positioned on the outside of the rows of hooks, substantially perpendicularly to the hooking path.

22 Claims, 3 Drawing Sheets

(58) Field of Classification Search
USPC .......................................................... 414/412
See application file for complete search history.

(56) References Cited

FOREIGN PATENT DOCUMENTS

| | | |
|---|---|---|
| EP | 2927175 | 10/2015 |
| GB | 2137157 | 10/1984 |
| GB | 2537407 | 10/2016 |

* cited by examiner

APPARATUS FOR UNLOADING MATERIAL AND BAG-EMPTYING MACHINE COMPRISING SAID APPARATUS

CROSS REFERENCE TO RELATED APPLICATIONS

This application is a US, National Phase filing of International Patent Application No. PCT/IB2018/058495 filed on Oct. 30, 2018, which claims the priority of Italian Patent Application No. 102017000125511 filed on Nov. 3, 2017. The disclosures of these applications are hereby incorporated by reference in their entirety.

DESCRIPTION

Technical Field

The present invention relates to an apparatus for unloading material, preferably material packed in bags positioned on a pallet. It further relates to a bag-emptying machine comprising such an unloading apparatus.

Technological Background

The invention can be applied particularly and preferably in industrial processes for processing plastic materials, where the material to be processed is supplied in granule form, suitably packaged in bags that are in turn orderly stacked on a loading base, typically a pallet, to facilitate their storage and transport.

The bags of material then have to be unloaded from the pallet and emptied of their contents into hoppers that feed the plastic material-processing machines.

To automate these operations, machines generally known as bag-emptiers have been produced; these machines comprise an unloading unit, comprising an apparatus for hooking a plurality of bags on the pallet, followed by an emptying unit for cutting the bags carried by the unloading apparatus so that the material contained therein is collected in a hopper.

A known example of a bag-emptying machine is described in EP 1838582, where the unloading apparatus comprises a gripper formed of two arrays of pairs of hooks oscillating against one another to hook the bags placed at the top of a pallet.

Further examples of bag-emptying machines are described in GB 2537407, U.S. Pat. No. 8,197,174, and DE 3643076.

It is believed necessary to develop an unloading apparatus and a bag-emptying machine that is simpler to produce.

SUMMARY OF THE INVENTION

The problem addressed by the present invention is that of providing an apparatus for unloading material and a bag-emptying machine, which are structurally and functionally designed to overcome, at least in part, one or more of the drawbacks identified above with reference to the cited prior art.

This problem is resolved by the present invention by providing an unloading apparatus and a bag-emptying machine produced according to the following disclosure.

In a first aspect thereof, the invention is therefore directed to an apparatus for unloading material.

Preferably, the unloading apparatus comprises a frame.

Preferably, a hooking device is mounted on the frame for hooking the material to be unloaded and removing it from the loading base.

The hooking device is preferably positioned above the material to be unloaded, vertically opposite the loading base on which the material is placed, so that the material can be hooked from above.

Preferably, the hooking device comprises a plurality of rows of curved hooks, each row of hooks being pivotable about a respective axis of rotation between a non-operating position, in which the hooks are retracted, and an operating position, in which the hooks are extended so as to hook the material to be unloaded. The movement of the hooks from the non-operating position to the operating position defines a hooking path.

Preferably, all the rows of hooks of the hooking device are pivotable from the non-operating position into the operating position, rotating in the same direction of rotation about the respective axes of rotation.

Preferably, the hooking device comprises an abutment element that is positioned on the outside of the rows of hooks.

Preferably, the abutment element is substantially perpendicular to the hooking path.

Thanks to these features, the unloading apparatus according to the invention can be constructed and produced in a simple manner and with a reduced number of components, while at the same time maintaining efficient action in unloading the material.

Consequently, in the hooking phase, where the material is driven by the hooks, in the direction defined by the hooking path, the material is advantageously blocked by the abutment element, thus assisting the penetration of the hooks in the material, which is thus hooked firmly.

In the aforesaid aspect, the present invention can have one or more of the following preferred characteristics.

Preferably, the frame is fixed and the material to be unloaded, for example a stack of bags positioned on a pallet, is positioned near it.

Preferably, the material consists of granules of plastic material packed in bags stacked on a pallet intended, for example, to be treated by a molding or extrusion process.

However, the unloading apparatus of the present invention can be used in applications other than the preferred one mentioned above. In fact, it is not strictly connected to the type of material to be unloaded nor to it being packed in bags. For example, an apparatus according to the present invention can be used for unloading bales of paper or plastic packaging, whether wrapped or not.

Similarly, the unloading apparatus of the invention is not strictly connected to the type of loading base from which the material has to be unloaded, even though it is configured particularly for unloading material positioned on pallets.

In a preferred embodiment, the hooks are moved by a single hydraulic actuator that, through a mechanical transmission system with articulated levers, controls all the rows of hooks by simultaneously rotating them synchronously.

The hooking device is simple to produce, requiring the provision of a single type of movement for the hooks, which can therefore be identical and can be moved by a reduced number of simple mechanical components.

In a preferred embodiment, when the hooks, are oscillated into a non-operating position, they are positioned above a work surface defined on the hooking device, whereas when they are oscillated into an operating position, they are positioned below the work surface.

Preferably, the work surface is formed by a plate, which is preferably perforated to allow hooks to pass between the non-operating position and the operating position.

This configuration makes it easier to detach any bag shreds when the hooks are oscillated into the non-operating position. In fact, during this movement, the hooks are retracted above the perforated plate while the plate itself abuts against the shreds of bags, which remain below the plate, and are detached from the hooks.

Preferably, the work surface is mounted on the frame so as to allow it to oscillate relative to the horizontal plane, albeit to a limited extent, so as to settle on the plane formed by the material to be unloaded, and also adapt to an orientation that is not perfectly horizontal.

In a preferred form, the work surface is fixed to cylinders with a vertical axis, guided so as to slide within respective seats made on a bearing structure of the hooking device. The seats advantageously have a slightly larger diameter than that of the vertical cylinders, to allow the latter to oscillate to a limited extent relative to the axis of the seats.

The work surface makes it possible to locate the material to be hooked, resting on the latter before the hooks are moved into the operating position; it also cooperates with the hooks in retaining the material.

In alternative embodiments, the work surface can be defined by a plurality of adjacent joists or rods or by a grid, rather than a plate.

In a preferred version, the unloading apparatus comprises a lifting member that raises the loading base, for example a pallet, towards the hooking device.

Preferably, sensors are fixed to the frame, the sensors detecting the presence of the material at a predefined distance from the hooking device, and the lifting member is halted and the hooking device lowered so as to rest on the material to be unloaded.

Preferably, the hooking device can move in an unloading direction, in which the material hooked by the hooking device is moved away from the loading base.

The unloading direction is preferably horizontal.

The material is preferably released from the hooking device in an unloading position.

In the preferred embodiment, the rows of hooks are positioned on the hooking device such that their axes of rotation are substantially perpendicular to the unloading direction.

Preferably, the hooks oscillate from the non-operating position into the operating position along the hooking path in a manner concordant with the unloading direction.

Consequently, moving the material in the unloading direction tends to cause the hooks to hook the material more deeply, increasing the strength by which the material is held.

Thus, in this way, the abutment element is positioned on a front side of the hooking device when it moves in the unloading direction and advantageously allows any residues from previous processing, for example residues of emptied, bags, to be removed from the path of the hooking device.

Preferably, the abutment element can be moved between a non-operating position and an operating position in which it is substantially perpendicular to the unloading direction.

Preferably, in the non-operating position the abutment element raised to a height greater than or equal to that of the work surface.

Thus, when the hooking device returns to the unloading unit, the abutment element can be moved into a non-operating position, preventing shreds of bags from being dragged along with it.

Preferably, the abutment element can pivot about an axis of rotation parallel to the axes of rotation of the rows of hooks.

Preferably, the abutment element is comb-shaped and comprises a plurality of teeth extending from a support shaft towards a respective free end, so as to be substantially parallel and equidistant.

In one embodiment, the hooking device further comprises a plurality of spikes that point towards a base of the frame and can be moved in a translational manner between a non-operating position, in which they are retracted away from the base, and an operating position, in which they are moved towards it.

These spikes advantageously allow the material to be locked in position while it is hooked by the hooks.

Preferably, the spikes are arranged in rows, corresponding and parallel to the rows of hooks.

Preferably, each spike is positioned close to a respective hook and, even more preferably, each, spike is offset from the hooking path of the respective hook.

Preferably, the spikes are moved between the non-operating position and the operating position substantially synchronously with the hooks.

In a second aspect thereof, the present invention is aimed at an apparatus for unloading material, comprising a frame and a hooking device mounted on the frame for hooking the material to be unloaded, wherein:

the hooking device comprises a plurality of rows of curved hooks, each row of hooks being pivotable about a respective axis of rotation between a non-operating position, in which the hooks are retracted, and an operating position, in which the hooks are extended so as to hook the material, all the rows of hooks of the hooking device are pivotable from the non-operating position into the operating position along a hooking path, rotating in the same direction of rot: loll about the respective axis of rotation, and the hooking device further comprises a plurality of spikes that point towards a base of the frame and can be moved in a translational manner between a non-operating position, in which they are retracted away from the base, and into an operating position, in which they are moved towards the base.

In a third aspect thereof, the present invention is aimed at a machine for emptying bags containing loose material.

Preferably, this machine comprises a unit for unloading the bags from a loading base, for example a pallet.

Preferably, this machine comprises an emptying unit, for receiving the bags from the unloading apparatus, cutting them, and emptying them of the material contained therein.

Preferably, the unloading apparatus is produced in accordance with the first or second aspect of the invention, possibly comprising one or more of the preferred optional features mentioned above.

It is to be understood that both the foregoing general description and the following detailed description are exemplary, but are not restrictive, of the disclosure.

BRIEF DESCRIPTION OF THE DRAWINGS

The features and advantages of the invention will be more clearly apparent from the following detailed description of some preferred exemplary embodiments thereof, illustrated for information and non-restrictively, with reference to the appended drawings, in which.

PREFERRED EMBODIMENTS OF THE INVENTION

Figure 1:
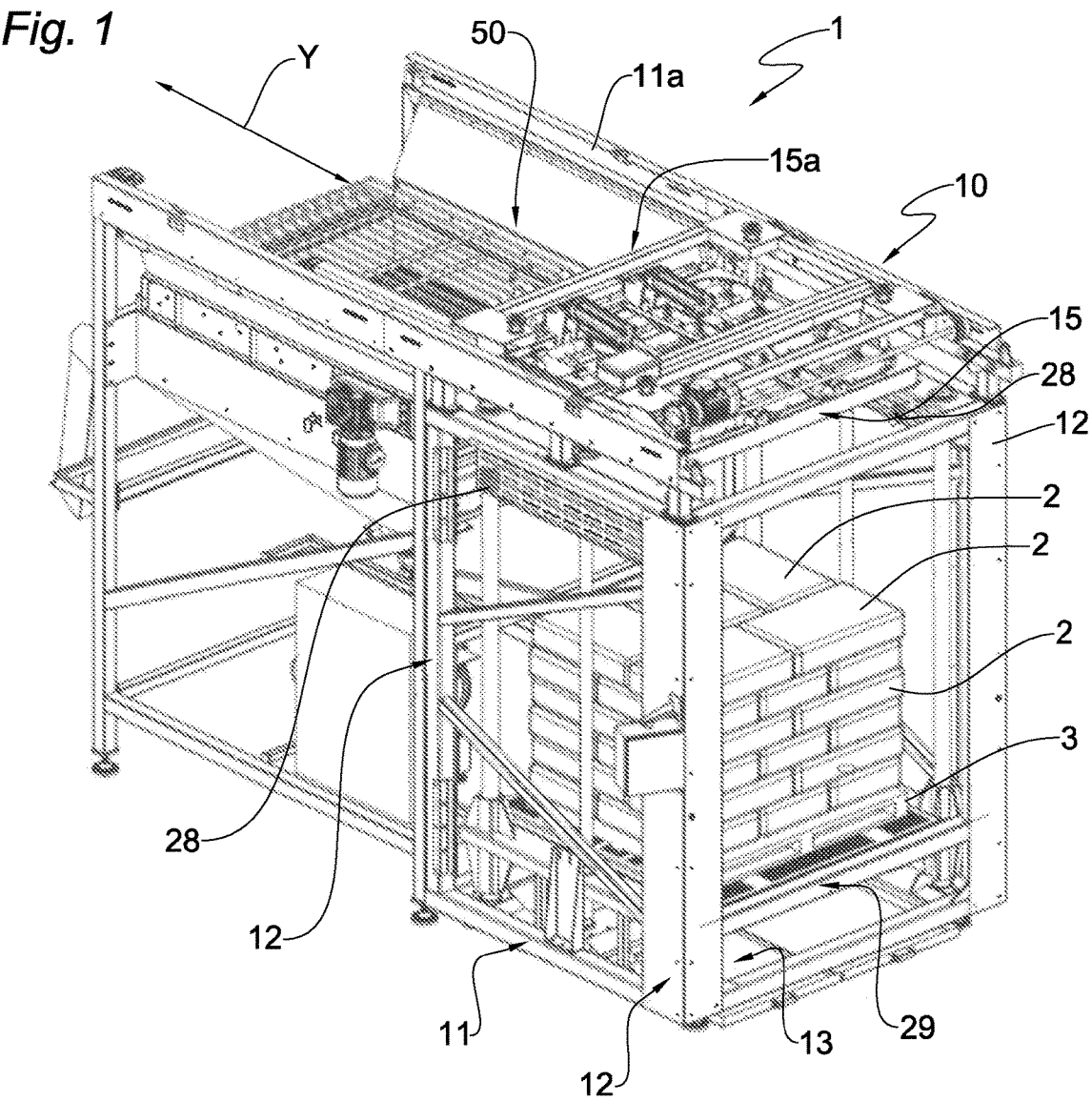
FIG. 1 is a diagrammatic view of a machine for emptying bags containing loose material comprising an unloading apparatus produced according to the present invention.
Figure 7:
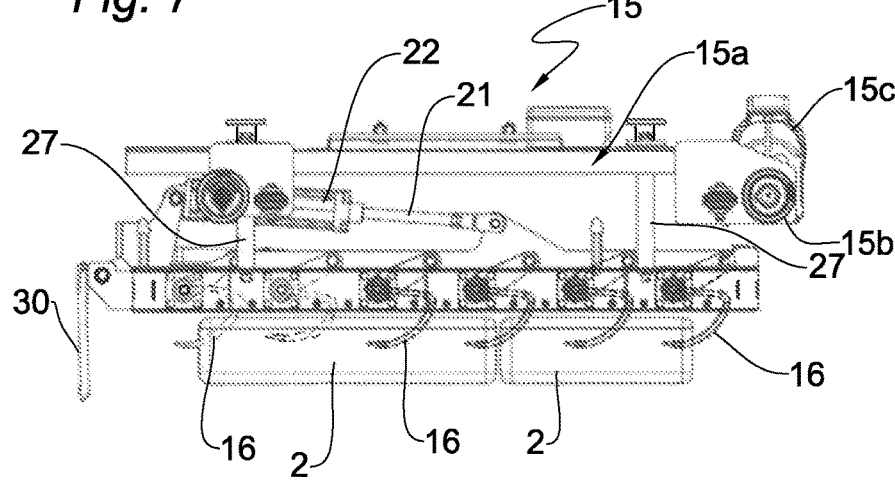
FIG. 7 is a similar view to FIG. 6 showing the unloading apparatus hooking a few bags of loose material.
Figure 10:
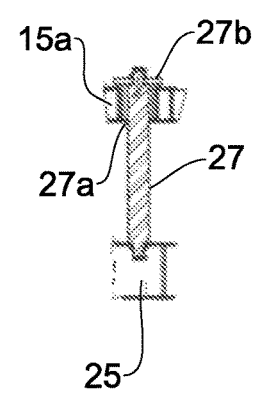
FIG. 10 is a view in section of a detail of the unloading apparatus in FIG. 1.
Figure 2:
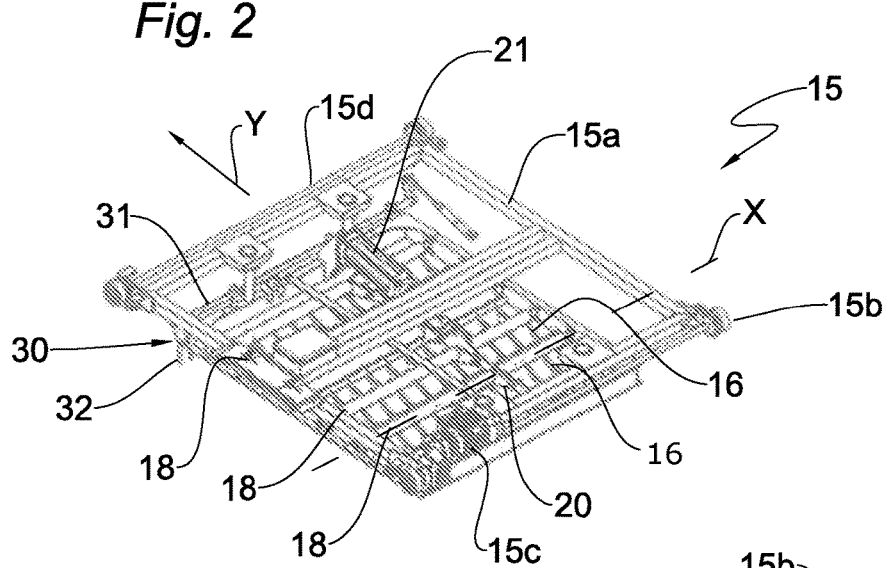
FIG. 2 is a perspective view from above of a component of the unloading apparatus in FIG. 1.
Figure 3:
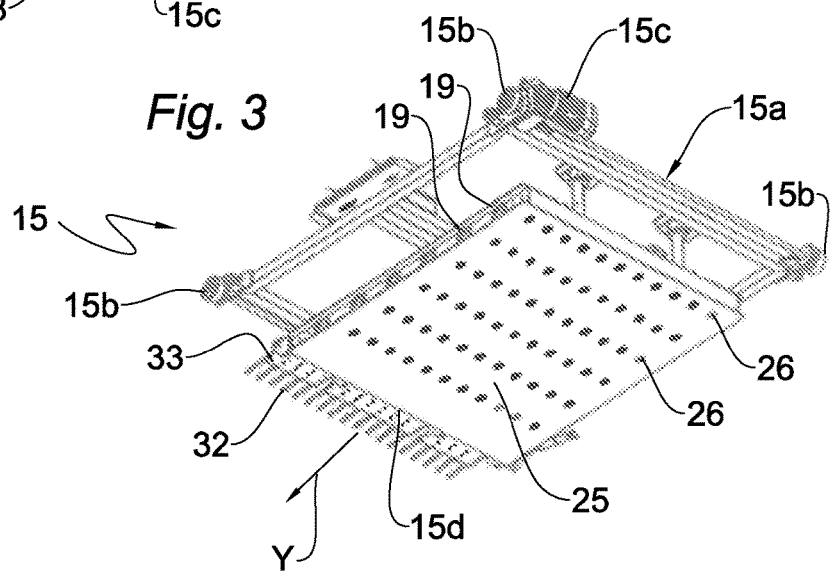
FIG. 3 is a perspective view from below of the component in FIG. 2, in a non-operating position.

Referring initially to FIGS. 1 to 7 and 10, the numeral 1 indicates overall a machine for emptying bags 2 containing granules of plastic material, suitably stacked on a pallet 3.

The machine 1 can be slaved to an installation for processing plastic material in granules, such as a molding or extrusion plant, for example.

As stated previously, however, the material to be unloaded, its packaging, as well as the support base from which it has to be unloaded and its intended use, may differ from those in the illustrative example described here.

The machine 1 comprises, overall, an unloading unit comprising an unloading apparatus 10 for unloading the bags 2 from the pallet 3, and an emptying unit 50, alongside the unloading unit, for cutting and emptying the bags 2 coming from the unloading unit.

The unloading apparatus 10 comprises a fixed frame 11, generally parallelepipedal in shape, formed of four columns 12 standing up vertically from a base 13.

On the side opposite the base 13, the unloading apparatus 10 further comprises a hooking device 15, mounted at the top of the frame 11, for hooking the bags 2 and moving them towards the emptying unit 50.

The hooking device 15 comprises a bearing structure 15a, which is locked onto, but able to slide over, the frame 11.

In particular, the bearing structure 15a is locked onto, and slides over, guides 11a extending in a substantially horizontal unloading direction Y, connecting the unloading unit to the emptying unit 50.

To allow the hooking device 15 to move along the guides 11a, the bearing structure 15a comprises wheels 15b engaged in the guides 11a and a motor 15c that controls the rotation of one or more wheels 15b.

The hooking, device 15 comprises a plurality of curved hooks 16 positioned in a plurality of parallel rows 17.

Each row of hooks 16 is fixed to a respective shaft 18 supported rotatably by pair of bearings 19, which are provided at the opposite ends of each shaft 18.

Each shaft 18 can therefore rotate at least partly about its longitudinal axis X, to move each row of hooks 16 pivoting about the axis of rotation X of the shaft 18 on which they are mounted, between a non-operating position and an operating position, described in more detail below.

Each hook 16 comprises a first, substantially rectilinear section 16a extending from the shaft 18 and a second, curved section 16b, extending as a continuation of the first section 16a and ending in a tip 16c.

The second section 16b preferably forms an arc of a circle.

All the hooks 16 are substantially identical to each other and are mounted in a substantially identical manner on their respective shafts 18.

All the shafts 18 are connected by respective articulated levers 20 to a control rod 21 positioned transversely to the axes of rotation X, which rod 21 is fixed to a hydraulic actuator 22.

The system for moving, the hooks 16 thus defined allows all the shafts 18 to be rotated simultaneously in the same direction of rotation and over an angle of the same value, using a simple movement of the hydraulic actuator 22.

The hooking device 15 further comprises a plate 25, fixed under the bearing structure 15a, on the side facing the base 13, on which the hooks 16 and the related control mechanism are mounted. In particular, the shafts 18, the bearings 19, the articulated levers 20, the control rood. 21 and the hydraulic actuator 22 are mounted above the plate 25, opposite the base 13.

The plate 25 defines a work surface for the hooking device 15, capable of locating the bags 2 before they are hooked by the hooks 16.

The plate 25 is advantageously provided with holes 26 that allow the hooks 16, or at least the respective tips 16c and the respective second sections 16b, to pass through when the hooks 16 oscillate about the axis of rotation X between the non-operating position and the operating position.

Figure 4:
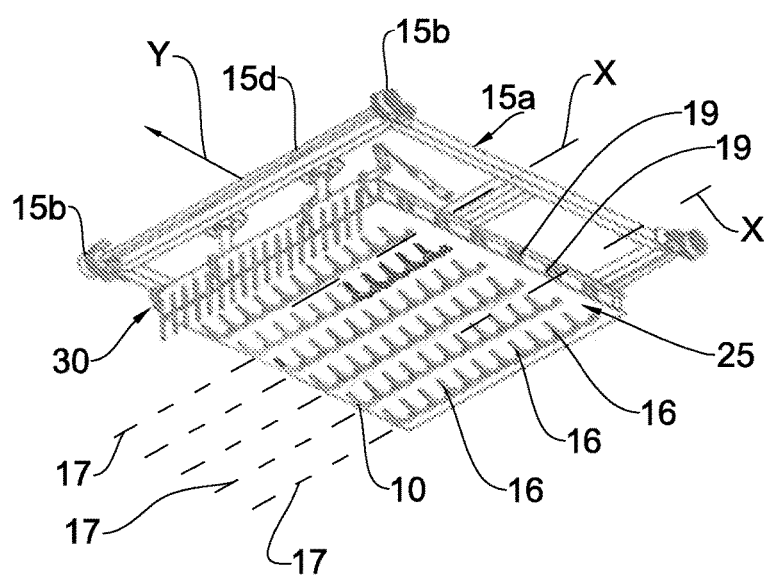
FIG. 4 is a perspective view from below of the component in FIG. 2, in an operating position.
Figure 5:
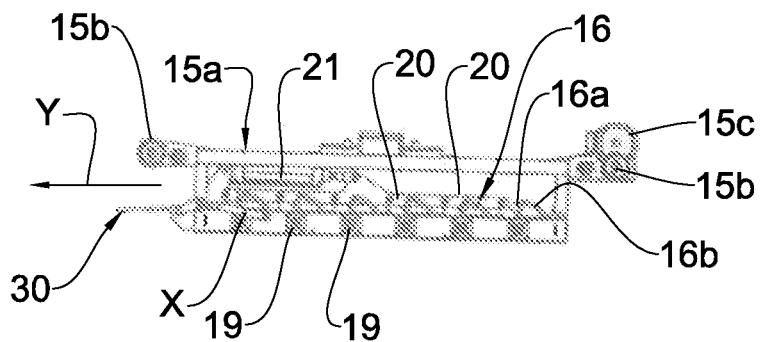
FIGS. 5 and 6 are side views of the component in FIG. 2 in a non-operating position and in an operating position as shown respectively in FIGS. 3 and 4.
Figure 6:
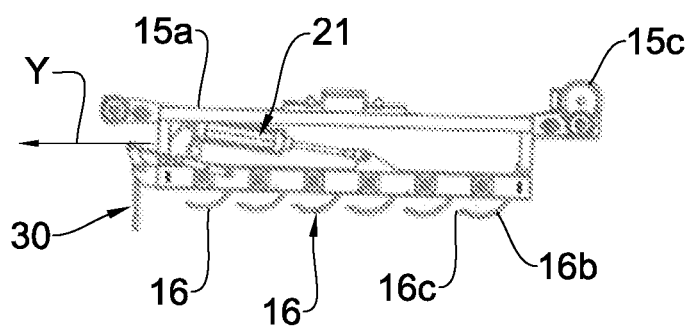

In particular, when oscillated into the non-operating position the hooks 16 are retracted above the plate 25 (FIG. 3), while when oscillated into the operating position, at least the tip 16c and the second, curved section 16c of the hooks 16 extend below the plate 25 (FIG. 4).

The oscillation of the hooks 16 between the non-operating position and the operating position defines a hooking path.

The plate 25 is connected to the bearing structure 15a of the hooking device 15 to allow it to oscillate relative to the horizontal plane, albeit to a limited extent.

In particular, the bearing structure 15a supports the plate 25 through cylinders 27 (four, for example) fixed at their lower ends to the plate 25 and extending vertically towards the bearing structure 15a where they are accommodated in respective seats 27a each having a vertical axis. The seats 27a each have a diameter a few centimeters greater than the diameter of the cylinders 27. Consequently, the cylinders 27 can slide vertically within the seats 27a but also tilt slightly relative to the vertical axis (more clearly visible in FIG. 10).

Thus, the plate 25 can rest on the plane formed by the material to be unloaded, and can also adapt to an orientation that is not perfectly horizontal.

A small flange 27b, with a larger diameter than that of the seats 27a, is fixed to the end of each cylinder 27 opposite the plate 25 to prevent the cylinders 27 from coming out of the seats 27a, and therefore the plate 25 falling from the bearing structure 15a.

Sensors 28 are also provided on the frame 11; they are positioned at a predefined distance below the hooking device 15 and are able to detect the presence of the material to be unloaded at a predefined height, for example approximately 10-20 cm below the plate 25.

A lifting member 29 is also provided at the bottom of the frame 11, on Which the pallet 3 to be unloaded is supported. The lifting member 29 can be raised from the base 13, to move the material to be unloaded towards the hooking device 15.

The hooking device 15 can move along the frame 11 in the substantially horizontal unloading direction Y, in which the bags 2 hooked by the hooking device 15 are moved away from the pallet 3 towards the emptying unit 50.

The unloading direction Y is substantially perpendicular to the direction defined by the axes of rotation X. and the hooks 16 are positioned on the shafts 18 in such a way that their oscillation from the non-operating position to the operating position along the hooking path is concordant with the unloading direction Y. In particular, when oscillated into an operating position, the tips 16c of the hooks 16 face in the unloading direction Y.

The unloading direction Y also defines a front side 15d of the unloading device 15, on which there is an abutment element 30, positioned on the outside of the rows 17 of hooks 16.

The abutment element 30 comprises a supporting shaft 31 mounted at the front side 15d of the bearing structure 15a so as to be able to oscillate about an axis parallel to the axes of rotation X between a non-operating position, in which it is substantially parallel to the plate 25, and an operating position, in which it is lowered below the plate 25 substantially perpendicularly to the unloading direction Y.

The abutment element 30 is comb-shaped, with a plurality of teeth 32 extending away from the supporting shaft 31, parallel to, and equidistant from, each other. An edge 33 is preferably provided in the part closest to the supporting shaft 31.

The unloading apparatus 10 operates as follows.

The material to be unloaded, for example the bags 2 stacked on the pallet 3, is taken to the unloading apparatus 10 and rests on the lifting member 29, which raises it up along the columns 12 towards the hooking device 15.

When the sensors 28 detect the presence of bags 2 at a predefined distance from the hooking device 15, they send a signal commanding the lifting member 29 to rise by a predefined amount, substantially equal to the distance between the sensors 28 and the plate 25.

In this way the bags 2 are raised until they abut against the plate 25 which, because it is able to oscillate relative to the horizontal plane, rests on the upper surface of the stack of bags 2, adapting to the orientation of that surface.

In this phase the hooks 16 are held in a non-operating position, above the plate 25.

As soon as the plate 25 settles on the bags 2, the abutment element 30 is lowered into an operating position and the hooks 16 oscillate into an operating position, rotating about the axes of rotation X. During this movement, after they have passed over the plate 25, the tips 16c of the hooks 16 pierce the bags 2, hooking them.

The rows 17 of hooks 16 are provided in suitable numbers and dimensions; they are spaced apart so that, with a single oscillating movement, all the bags 2 forming the upper layer of the stack can be hooked.

If necessary, the abutment element 30 prevents the bags 2 from being moved by the hooks 16 during their oscillating movement, should the tips 16c not pierce the bags 2 rapidly.

The hooking device 15 is then, moved in the unloading direction Y towards the emptying unit 50, where the bags 2, while hooked by the hooking device 15, are cut and emptied. Thus, the emptying unit 50 defines a position for unloading the bags 2.

On the path, towards the emptying unit 50, the teeth 32 of the abutment element 30 remove from the path any remnants of bags 2 cut in the previous unloading and emptying cycles.

The teeth 32 are also advantageously shaped so as to pass between a plurality of blades provided on the emptying unit 50, intended to cut the bags 2 while they are hooked on the hooking device 15.

The configuration of the abutment element 30 advantageously allows the teeth 32 to pass between the blades of the emptying unit 50 without interfering with them.

Similarly, the positioning of the hooks 16, parallel to the unloading direction and at a suitable distance from each other, also allows the hooks 16 to firmly hook the bags 2 passing between the blades of the emptying unit 50 while the blades cut the bags 2, to empty them of the material contained therein.

Once the bags 2 are emptied, the hooks 16 oscillate into the non-operating position, and are retracted over the plate 25 through the holes 26, assisting any shreds of bags 2 to detach from the hooks 16.

Similarly, the abutment element 30 is also moved into a non-operating position, so that when it returns towards the unloading unit, no shreds of bags 2 are dragged along with it.

The hooking device 15 is then moved back into the initial position, over the stack of bags 2 to be unloaded and the procedure described above is repeated until the pallet 3 is completely unloaded.

Figure 8:
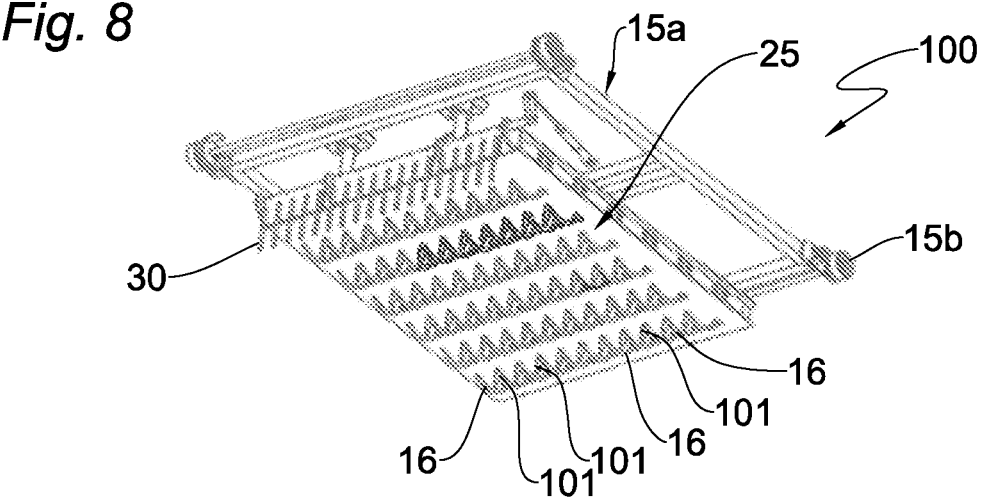
FIG. 8 is a similar view to that in FIG. 4 of a second exemplary embodiment of an unloading apparatus produced according to the present invention.
Figure 9:
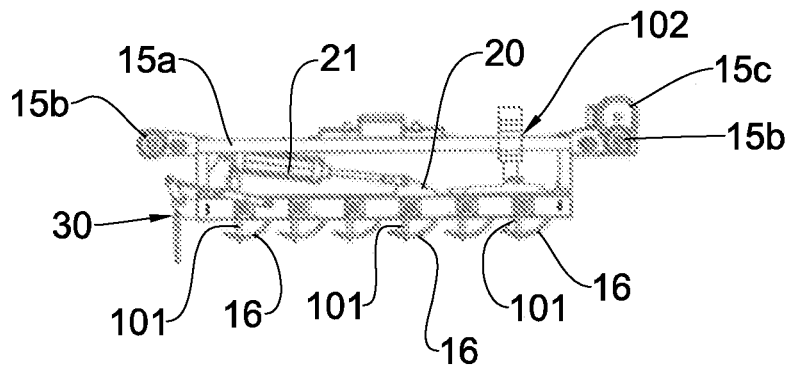
FIG. 9 is a similar view to that in FIG. 6 of the unloading apparatus in FIG. 8.

FIGS. 8 and 9 show a second exemplary embodiment of an unloading apparatus produced according to the invention, indicated overall by the reference numeral 100.

The unloading apparatus 100 differs from the unloading apparatus 10 described above in that the hooking device 15 also comprises a plurality of spikes 101, in addition to the hooks 16.

Each spike 101 points towards the base 13 of the frame 11 and can be moved in a translational manner between a non-operating position in which it is retracted over the plate 25, away from the base 13, and an operating position in which it is moved towards the base 13, so as to protrude with one of its ends pointing below the plate 25.

The spikes 101 are arranged in rows, corresponding and parallel to the rows 17 of hooks 16, but at a distance from them, so that one hook 16 corresponds to each spike 101.

Provision is also made for each spike 101 to be positioned close to a respective hook 16 and offset from the hooking path of the respective hook 16.

The spikes 101 are moved between the non-operating position and the operating position by a moving system 102 distinguished from the system for moving the hooks 16 but activated simultaneously so as to synchronize the movement of the spikes 101 with the movement of the hooks 16.

The operation of the unloading apparatus 100 is similar to that of the unloading apparatus 10, except that when the hooks 16 oscillate towards the operating position so as to hook the bags 2, the spikes 101 are also lowered simultaneously, and they pierce the bags 2 and allow the bags 2 to be held in position more strongly, to assist the hooking action of the hooks 16.

The present invention thus achieves the aims mentioned above.

Although illustrated and described above with reference to certain specific embodiments, the present disclosure is nevertheless not intended to be limited to the details shown. Rather, various modifications may be made in the details within the scope and range of equivalents of the claims and without departing from the spirit of the disclosure.

The invention claimed is:

1. An apparatus for unloading material, comprising:
a frame; and
a hooking device mounted on the frame for hooking the material, the hooking device including a plurality of rows of curved hooks defining an outside, each row of hooks being pivotable about a respective axis of rotation between a non-operating position, in which the hooks are retracted, and an operating position, in which the hooks are extended so as to hook the material, wherein all the rows of hooks of the hooking device are configured to oscillate from the non-operating position into the operating position along a hooking path, the rows of hooks rotating in the same direction of rotation about the respective axes of rotation, wherein the hooking device further includes an abutment element that is positioned on the outside of the rows of hooks, substantially perpendicularly to the hooking path, so as to block the material when driven by the hooks and to assist the penetration of the hooks in the material.

2. The apparatus according to claim 1, wherein the hooking device defines a work surface and, in the non-operating position, the hooks are positioned above the work surface defined on the hooking device and, in the operating position, the hooks are positioned below the work surface.

3. The apparatus according to claim 2, wherein the work surface is defined by a plate of the hooking device.

4. The apparatus according to claim 3, wherein the plate is perforated in order to allow the hooks to pass through the plate when they oscillate between the non-operating position and the operating position.

5. The apparatus according to claim 1, wherein the hooking device is configured to move along the frame in an unloading direction, along which the material hooked by the hooking device is moved into an unloading position, and wherein the axis of rotation is substantially perpendicular to the unloading direction.

6. The apparatus according to claim 5, wherein the hooks oscillate from the non-operating position into the operating position along the hooking path in a manner concordant with the unloading direction.

7. The apparatus according to claim 5, wherein the abutment element is configured to move between a non-operating position and an operating position, in which it is perpendicular to the unloading direction.

8. The apparatus according to claim 1, wherein the frame has a base and the hooking device further includes a plurality of spikes that point towards the base of the frame and are configured to move in a translational manner between a non-operating position, in which they are retracted away from the base, and an operating position, in which they are moved towards the base.

9. The apparatus according to claim 8, wherein each spike is positioned close to a respective hook.

10. The apparatus according to claim 9, wherein each spike is offset with respect to the hooking path of the respective hook.

11. The apparatus according to claim 10, wherein the spikes move between the non-operating position and the operating position substantially synchronously with the hooks.

12. The apparatus according to claim 8, wherein the spikes move between the non-operating position and the operating position substantially synchronously with the hooks.

13. The apparatus according to claim 9, wherein the spikes move between the non-operating position and the operating position substantially synchronously with the hooks.

14. A machine for emptying bags containing loose material, comprising:
an unloading unit for unloading the bags from a loading base; and
an emptying unit for receiving the bags from the unloading unit, cutting the bags, and emptying the material contained in the bags,
wherein the unloading unit includes an apparatus for unloading material according to claim 1.

15. The apparatus according to claim 1, wherein the abutment element can pivot about an axis of rotation parallel to the axes of rotation of the rows of hooks.

16. The apparatus according to claim 1, wherein the abutment element is comb-shaped and comprises a plurality of teeth extending from a support shaft towards a respective free end, so as to be substantially parallel and equidistant.

17. An apparatus for unloading material, comprising:
a frame; and
a hooking device mounted on the frame for hooking the material, the hooking device including
a plurality of rows of curved hooks defining an outside, each row of hooks being pivotable about a respective axis of rotation between a non-operating position, in which the hooks are retracted, and an operating position, in which the hooks are extended so as to hook the material, wherein all the rows of hooks of the hooking device are configured to oscillate from the non-operating position into the operating position along a hooking path, the rows of hooks rotating in the same direction of rotation about the respective axis of rotation,
an abutment element that is positioned on the outside of the rows of hooks, substantially perpendicularly to the hooking path, so as to block the material when driven by the hooks and to assist the penetration of the hooks in the material, and
a plate that defines a work surface and, in the non-operating position, the hooks are positioned above the work surface and, in the operating position, the hooks are positioned below the work surface, the plate perforated in order to allow the hooks to pass through the plate when they oscillate between the non-operating position and the operating position.

18. The apparatus according to claim 17, wherein the hooking device is configured to move along the frame in an unloading direction, along which the material hooked by the hooking device is moved into an unloading position, and wherein the axes of rotation are substantially perpendicular to the unloading direction.

19. The apparatus according to claim 18, wherein the hooks oscillate from the non-operating position into the operating position along the hooking path in a manner concordant with the unloading direction.

20. The apparatus according to claim 18, wherein the abutment element is configured to move between a non-operating position and an operating position, in which it is perpendicular to the unloading direction.

21. The apparatus according to claim 17, wherein the frame has a base and the hooking device further includes a plurality of spikes that point towards the base of the frame and are configured to move in a translational manner between a non-operating position, in which they are retracted away from the base, and an operating position, in which they are moved towards the base.

22. The apparatus according to claim 21, wherein each spike is positioned close to a respective hook and is offset with respect to the hooking path of the respective hook, the spikes moving between the non-operating position and the operating position substantially synchronously with the hooks.

\* \* \* \* \*